United States Patent [19]

Dames et al.

[11] Patent Number: 5,697,649
[45] Date of Patent: Dec. 16, 1997

[54] ARTICLES EMPLOYING A MAGNETIC SECURITY FEATURE

[75] Inventors: Andrew Dames; Geraint Davies, both of Cambridge, United Kingdom; Alaric Naiman, Lincoln, Mass.

[73] Assignee: Crane & Co., Inc., Dalton, Mass.

[21] Appl. No.: 439,295

[22] Filed: May 11, 1995

[51] Int. Cl.[6] .................................................. B42D 15/00
[52] U.S. Cl. ..................... 283/83; 283/901; 340/572; 162/140; 425/611
[58] Field of Search ........................ 283/82, 83, 72, 283/901; 162/140; 428/915, 607, 611, 622, 626, 650, 651; 427/7; 340/551, 572

[56] References Cited

U.S. PATENT DOCUMENTS

| | | |
|---|---|---|
| 4,183,989 | 1/1980 | Tooth . |
| 4,652,015 | 3/1987 | Crane . |
| 4,940,966 | 7/1990 | Pettigrew et al. . |
| 4,960,651 | 10/1990 | Pettigrew et al. . |
| 5,093,184 | 3/1992 | Edwards ............................ 283/83 |
| 5,196,681 | 3/1993 | Mantegazza . |
| 5,388,862 | 2/1995 | Edwards ..................... 283/83 X |
| 5,439,755 | 8/1995 | Fujita et al. ..................... 283/82 X |
| 5,486,022 | 1/1996 | Crane ............................ 283/83 |
| 5,516,153 | 5/1996 | Kaule ............................. 283/85 |

FOREIGN PATENT DOCUMENTS

| | | |
|---|---|---|
| 0279880 | 8/1988 | European Pat. Off. . |
| 0310707 | 4/1989 | European Pat. Off. . |
| 0319157 | 6/1989 | European Pat. Off. . |

*Primary Examiner*—Willmon Fridie, Jr.
*Attorney, Agent, or Firm*—Mary R. Bonzagni, Esq.; Holland & Bonzagni, P.C.

[57] ABSTRACT

Articles for use with security documents are disclosed which include planchettes and security threads that comprise a plastic substrate having at least one security feature employing soft magnetic metal located thereon. Preferred articles comprise at least two security features where a first security feature is made up of an optionally repeating pattern of soft magnetic metal adapted to generate a signal or a series of signals in an interrogation field applied by a detection system for remote detecting and optionally for remote reading or identifying the article. A second security feature is a public security feature that comprises magnetic and/or non-magnetic metal formed indicia. The first and second security features of this invention can be coextensive features.

31 Claims, 1 Drawing Sheet

ARTICLES EMPLOYING A MAGNETIC SECURITY FEATURE

FIELD OF THE INVENTION

The present invention relates generally to machine detectable and optionally machine readable and visually verifiable articles for use with security documents that offer unique authenticating properties and an enhanced degree of anti-forgery security. These articles, such as planchettes and security strips or threads, are also suitable for use with means of identification, such as labels. The present invention further relates to security papers employing such an article (s).

BACKGROUND OF THE INVENTION

It is known that security documents may be rendered less susceptible to forgery or counterfeiting by including materials in various forms within the body of the document. These materials may be introduced during manufacture and may take the form of a continuous thread or ribbon of polyester, regenerated cellulose, polyvinyl chloride or other plastics film. These materials may also take the form of planchettes of plastic and/or paper. Such anti-forgery devices generally are coated with a layer of metal and/or hard (i.e., permanent) magnetic material. Threads coated with a layer of metal, such as aluminum, may display: positive image characters or indicia as described in U.S. Pat. No. 4,652,015 and in EP 0 279 880 and as currently used in United States currency; or may display negative image characters or indicia that are defined by metal boundaries as described in EP 0 279 880 and in EP 0 319 157 and as currently used in currencies such as the German Deutsche Mark. Such threads are visually verifiable by members of the public and are machine detectable by conventional thread detectors that detect the presence or absence of conductive features on the threads. Threads or planchettes coated with a layer of magnetic material may be detected by suitable devices that depend upon intrinsic magnetic properties such as permeability, retentivity, hysterisis loop and coercivity or upon special magnetic properties given to the material such as discontinuities in the magnetic material or coded variations in the magnetization of the material.

Examples of uses of magnetic materials in the field of security papers include: EP 0 310 707 A2 which discloses a thread coated with a magnetic iron oxide bar code. Bars or regions of the bar code can have different thicknesses that result in detectable differences in magnetic intensities. These differences in bar thicknesses are hidden by a masking or paint layer; U.S. Pat. No. 5,196,681 that also teaches a thread coated with a magnetic iron oxide bar code. The bars or regions of the bar code are made up of different ranges of products that result in regions having detectable differences in coercivities. Moreover, these regions also have different thicknesses that result in different detectable magnetic intensities. Accordingly, this reference teaches that it is possible to obtain two different output readings of the same plurality of bars or regions by varying the magnetic field which orientates the regions; and U.S. Pat. No. 4,183,989 which discloses a thread coated with magnetic material and with a layer of either a luminescent or a non-magnetic metal material. Printed patterns of a composition containing magnetic material along the length of the subject threads are contemplated.

Further to the above, it has been proposed in disclosure number 32354, as published in the March 1991 edition of Research Disclosure, that a magnetic metal (e.g., nickel, cobalt, iron or an alloy of such materials) be used to form the characters or continuous metal path of U.S. Pat. No. 4,652, 015 and EP 0 319 157.

The above-referenced uses or proposed uses of magnetic materials involve so-called "hard" magnetic materials having high coercivities of greater than 10 kiloamperes/meter. As alluded to above, these materials are detected by their remanent magnetization after exposure to a magnetic field. The magnetic field is applied either at manufacture, or just before detection. Additional materials used in such applications include magnetic powders such as ferrites, and thin sheets or ribbons of crystalline magnetic material, such as nickel. (See, e.g., Column 7, lines 1 to 6 of EP 0 310 707 A2.)

The use of such materials in conventional detection schemes requires: their incorporation as a separate feature; magnetization of these materials using high magnetic fields; and the use of sensitive magnetic read heads for detection. Moreover, reading must take place when the head and the magnetic feature are in close proximity or virtual contact (i.e., 0.01–0.10 millimeters).

Magnetic materials have been used in the field of electronic article surveillance, as well. Article surveillance or identification (ID) systems have developed features that incorporate several discrete magnetic elements with each element giving a different response to an applied interrogation field. In this way, when an interrogation field is applied to a tag or marker, the multiplicity of characteristics of the response which is received can be separated by electronic processes (i.e., "decoded") to identify the tag or marker. The separable characteristic can be identified as frequency, magnetic intensity switch-on threshold, or some combination of the two. However, such uses have not employed extremely thin feature layers or small scale patterning.

Magnetic materials used in such applications include "soft" magnetic materials having low coercivities of less than 100 amperes/meter, that can be interrogated from a distance, with a relatively weak magnetic field. These materials are unique and require extremely meticulous control of capital-intensive equipment for their production.

Examples of uses of magnetic materials in the field of electronic article surveillance include: U.S. Pat. 4,940,966 that discloses the use of tags or markers that carry a plurality of magnetic elements where such elements either have different ferromagnetic material compositions and thereby have a variety of magnetically nonlinear characteristics, or have several different magnetically soft and/or hard and/or semi-hard elements in proximity to one another (various combinations of these different elements reportedly characterize different objects, and give rise to specific magnetic signatures); and U.S. Pat. No. 4,960,651 that discloses antipilferage tags or markers that employ a thin film of amorphous metal glass. The thin film is claimed as being no greater than 6 microns in thickness, however, thicknesses below 500 nanometers (nm) or 5000 angstroms (Å) are disclosed as problematic, if in fact achievable, where "surface pinning effects become dominant and the signal obtained from the tag in an interrogation gate is poor." (Column 5, lines 1 to 4 of U.S. Pat. No. 4,960,651).

There is a continuous and growing need to render articles for use with security documents more difficult to forge and more amenable to automatic validation or remote detection.

It is therefore an object of the present invention to provide articles for use with security documents that have at least one security feature that employs extremely thin layers of soft magnetic materials, and that is amenable to high speed automatic validation in non-contact detection systems.

It is a more particular object of the present invention to provide articles that employ at least two security features including a soft magnetic security feature, in addition to a visually verifiable public security feature.

It is a further object to provide an article that offers a co-extensive machine readable soft magnetic security feature and a public security feature.

It is yet a further object of the present invention to provide a security paper that employs such an article(s).

SUMMARY OF THE INVENTION

The present invention therefore provides an article for use with security documents and means of identification such as labels, which comprises at least one security feature that employs a soft magnetic metal. In a preferred embodiment, the present invention provides an article that comprises at least two security features where a first security feature is a machine detectable and optionally machine readable security feature made up of an optionally repeating pattern of soft magnetic metal and where a second security feature is a public security feature comprising magnetic and/or non-magnetic metal formed indicia.

The present invention further provides a security paper having an article(s), as defined hereinabove, at least partially embedded therein and/or mounted thereon.

The foregoing and other features and advantages of the present invention will become more apparent from the following description and accompanying drawings.

DESCRIPTION OF THE PREFERRED EMBODIMENT

Figure 1:
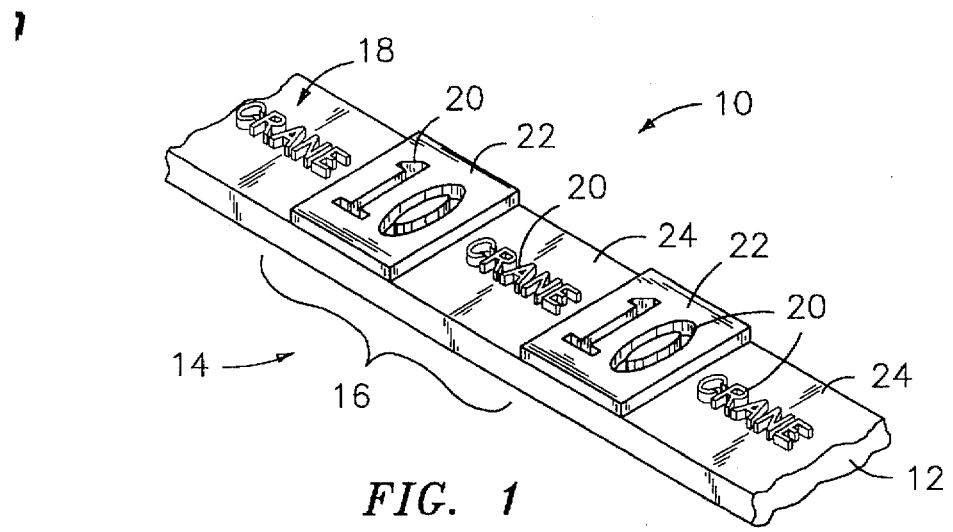
FIG. 1 is a schematic perspective view of a preferred embodiment of the present inventive article in the form of a security thread employing a first and a second security feature.

Although the present invention is described hereinbelow generally in association with security papers, such as banknotes and the like, the invention is not so limited. The inventive article can be utilized with any document or means of identification for authentication purposes.

Articles usable in the present invention include articles in the form of threads, planchettes or platelets, and the like.

The magnetic metals contemplated by the present invention for use with the security feature or first security feature are soft magnetic metals having low coercivities of less than about 5000 amperes/meter (A/m), when measured by an alternating current magnetometer at frequencies of from about 10 kilohertz (kHz) to about 100 kHz. Preferred soft magnetic metals have coercivities of between about 50 A/m and about 5000 A/m, and more preferably between about 100 A/m and about 2000 A/m. The soft magnetic metals contemplated demonstrate toughness and resilience to mechanical deformation and in addition have a high intrinsic relative permeability of from about 200 to about 100,000, demonstrate saturation at low magnetic fields of below about 10,000 A/m, and have a degree of magnetic non-linearity that is sufficiently high to give measurable harmonic signals during mid-range (i.e., 1 to 2 mm) examination of magnetic properties with an imposed magnetic field. Preferred soft magnetic metals include amorphous metal glass materials such as amorphous alloy soft magnetic metals, including cobalt/iron based alloys, iron/nickel based alloys and cobalt/nickel based alloys. Suitable cobalt/iron based alloys are available from Vacuumschmelze GmbH, Postfach 2253, D-63412, Hanau, Germany under the trade designations: Vacuumschmelze 6025 (66% cobalt (Co), 4% iron (Fe), 2% molybdenum (Mo), 16% silicon (Si) and 12% boron (B)); Vacuumschmelze 6030 (similar to Vacuumschmelze 6025, around 70% Co, minor constituents unknown); and Vacuumschmelze 6006 (46% Co, 26% Ni, 4% Fe, 16% Si and 8% B). Suitable iron/nickel based alloys are available from Allied-Signal, Inc., Parsippany, N.J. 07054 under the trade designations: Allied Metglas 2714 and 2704. Such materials give an amorphous structure under certain deposition conditions.

The magnetic metal contemplated for use with the second security feature of the present invention is not restricted and includes both soft and hard magnetic metals.

The non-magnetic metals contemplated by the present invention include aluminum, nickel, and silver, with the preferred metal being aluminum.

Referring to the drawings in detail, the preferred article of the present invention is shown and generally designated by the reference numeral 10. The inventive article 10 basically comprises a plastic substrate 12 having at least one security feature that employs a soft magnetic metal located thereon. The subject drawings depict preferred embodiments of article 10 which comprise a plastic substrate 12 having two security features, where a first security feature 14 comprises an optionally repeating pattern 16 of soft magnetic metal and where a second security feature 18 comprises magnetic and/or non-magnetic metal formed indicia 20. The optionally repeating pattern 16 of the first security feature 14 comprises at least one soft magnetic metal region 22, and at least one partitioning region 24, where such regions are optionally in alternating sequence in pattern 16 which extends along the length of the plastic substrate 12. Partitioning region(s) 24 serves to allow contiguous metal regions 22 to act quasi-independently from each other magnetically when article 10 is subjected to any appropriate data/identification/denomination interrogation scheme. In other words, the detectable characteristics of the partitioning region 24, if any, do not interfere with the detectable difference of the signals generated by contiguous metal regions 22.

Figure 4:
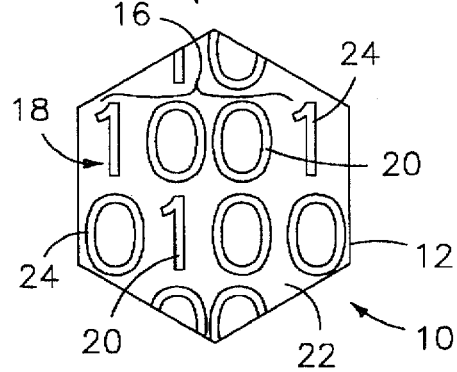
FIG. 4 is a plan view of the present inventive article, in the form of a planchette or platelet, employing a first and a second security feature.

In FIG. 1, article 10 is in the form of a security thread and the pattern 16 comprises one magnetic metal region 22 and one partitioning region 24, with both regions adopting a rectangular configuration. The metal formed indicia 20 are located in both the magnetic metal region 22 as magnetic metal formed indicia and in the partitioning region 24 as metal indicia. In another more preferred embodiment, as displayed in FIG. 2, the pattern 16 of article 10 (also in the form of a security thread), comprises three magnetic metal regions 22 a, b, c, of increasing thicknesses, so as to provide regions of differing magnetic intensities, and three partitioning regions 24 a, b, c, that adopt the configuration of a dollar sign. The metal-formed indicia 20 are located in and between each magnetic metal region 22 a,b,c, of pattern 16. In other words, the metal-formed indicia 20 that adopt the configuration of a dollar sign are co-extensive with partitioning regions 24 a, b, c. The term co-extensive, as used herein, is intended to mean that the subject regions and indicia have the same spatial boundaries. FIG. 3 displays yet another more preferred embodiment of the present invention, where the magnetic metal regions 22 of the first security feature 14 and the second security feature 18 are co-extensive. For example, in FIG. 3 the metal formed indicia 20 of the second security feature 18 are magnetic metal indicia that form the magnetic metal region(s) 22 of the first security feature 14. FIG. 4 displays a planchette in accordance with the present invention where the partitioning regions 24 of the first security feature 14 and the second security feature 18 are co-extensive. In particular, the metal formed indicia 20 form the partitioning regions 24 of the first security feature 14.

The plastic substrate 12 of the present inventive article 10 may be manufactured from any clear or translucent, and preferably non-magnetic and non-conductive, material. Such materials include polyester, regenerated cellulose, polyvinyl chloride, and other plastic film, with the preferred material being polyester. Such films remain intact during the papermaking process and preferably have a width ranging from about 0.5 millimeters (mm) to about 3.0 mm.

The optionally repeating pattern 16 of the first security feature 14 of the present invention comprises at least one soft magnetic metal region 22 and at least one partitioning region 24, optionally in alternating sequence in pattern 16 which extends along the length of the plastic substrate 12. Other contemplated sequences include blocks of a plurality of magnetic metal regions 22, employing various amounts of magnetic metal, separated by partitioning regions 24. Where partitioning region 24 serves to allow contiguous regions 22 to act quasi-independently from each other magnetically this region 24 may take the form of a magnetic metal-free region or may take the form of a region having reduced magnetic metal cover as compared to contiguous magnetic metal regions 22. The magnetic metal region(s) 22 and the partitioning region(s) 24 can adopt any shape or configuration.

Where shape (e.g., size and thickness) determines the magnetic response through the influence of shape-determined permeability effects, and through the influence of thickness on magnetic coercivity, it is preferred that each magnetic metal region 22 of the present inventive article 10 have a thickness ranging from about 0.01 to about 10 microns and more preferably have a thickness of from about 0.10 to about 0.50 microns. It is also preferred that each magnetic metal region 22 have a length along the lateral edge of the plastic substrate 12 ranging from about 0.1 mm to about 5 mm. The preferred article 10 having magnetic metal regions 22 adopting the above-referenced dimensions should render relative shape-determined magnetic permeability values in a preferred range of 200 to 10,000. Such high permeability enables the magnetic metal to be saturated easily in weak magnetic fields. Moreover, saturation that occurs at particular fields provide further authentication means.

The second security feature 18 can be a separate and/or co-extensive public security feature and comprises magnetic and/or non-magnetic metal formed indicia, such as metal characters or clear characters defined by metal boundaries. In particular, magnetic metal formed indicia 20 or clear characters can form a part of each magnetic metal region 22 and partitioning region 24 and/or can form partitioning region(s) 24, magnetic metal indicia 20 or magnetic metal characters can form the magnetic metal region(s) 22 and/or a part of each partitioning region 24, while non-magnetic metal indicia or non-magnetic metal formed indicia 20 can form a part of partitioning region(s) 24. In a preferred embodiment, where the article 10 is a security thread embedded in a security paper, the indicia 20 create a term or phrase that is not readily discernable in reflective illumination, but which becomes legible to the viewing public in transmitted illumination.

The first and second security features 14, 18 may be formed by depositing metal on the plastic substrate 12 by any one of a number of methods including, but not limited to, methods involving selective metallization by electrodeposition, directly hot stamping onto the substrate 12 or using a mask or template in a vacuum metallizer, and methods involving metallization followed by selective demetallization by chemical etching, laser ablation and the like.

Methods involving metallization followed by selective demetallization are preferred. Contemplated metallization or deposition techniques include sputtering, e.g., planar magnetron sputtering, electron beam or thermal evaporation/sublimation, and electrolytic chemical deposition in addition to organometallic vapor pyrolysis. A preferred metallization or deposition technique is sputtering.

Sputtering is a physical vapor deposition process that is carried out in a vacuum chamber, in which ions of gas (e.g., argon), are accelerated across a difference in electrical potential with sufficient force to eject atoms from a target. The ejected atoms travel through a partial vacuum until they collide with a surface (e.g., plastic substrate) on which they can condense to form a coating.

In the present invention it is preferred that the target used in the preferred sputtering process (e.g., an alloy capable of forming an amorphous metal glass) be prepared by plasma spraying from a melt and that the deposited material not be annealed after deposition.

Contemplated selective demetallization techniques are techniques where deposited material is selectively removed from a target surface. As set forth above, these techniques include chemical etching and laser ablation etching. Also included are abrasion and lift-off techniques. Lift-off techniques contemplate the selective removal of deposited material by selective adhesive application followed by removal of the adhesive on a carrier. Chemical etching and laser ablation techniques are preferred.

Chemical etching can be carried out by selective printing of a resist followed by chemical etching using an appropriate etchant such as ferric chloride or a hydrofluoric acid/nitric acid mix.

Figure 2:
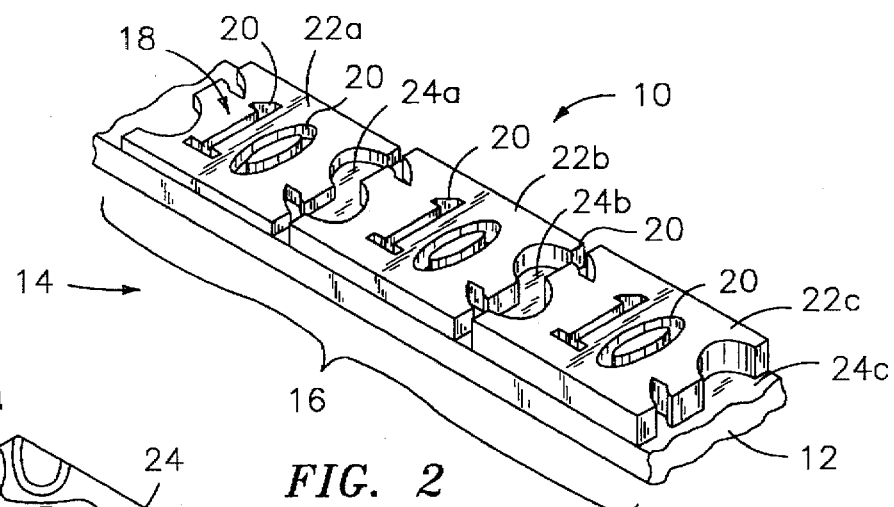
FIG. 2 is a schematic perspective view of another preferred embodiment where a first security feature of the present inventive article, again in the form of a thread, has magnetic metal regions of augmented thicknesses so as to provide regions of differing magnetic response.
Figure 3:
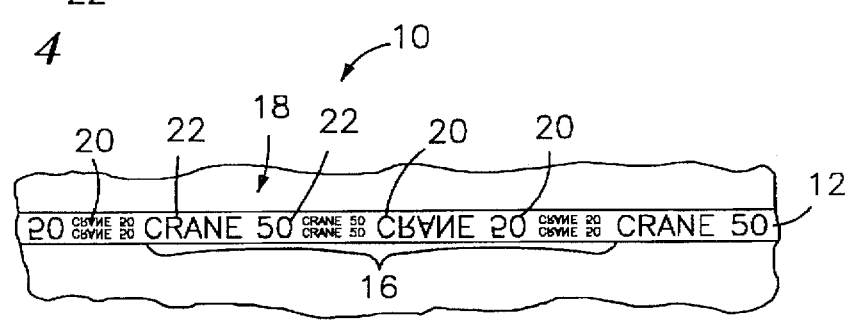
FIG. 3 is a plan view of yet a further preferred embodiment of the present inventive article, in the form of a security thread, where a first security feature and a second security feature are co-extensive features.

To achieve magnetic metal regions 22 of augmented thicknesses as shown in FIG. 2, etching techniques that only partially remove the original thickness of the deposited metal may be employed in conjunction with techniques that serve to etch to the full depth of the deposited metal layer(s).

Laser ablation etching can be carried out at reduced laser power, where the soft magnetic metal of the present invention, when heated to temperatures of about 350° to 400° C., crystallizes out of the amorphous state. The resulting morphological disruption typically causes the material to flake and crumble. Accordingly, power requirements are reduced when compared to requirements inherent in the laser etching of vacuum deposited aluminum.

In addition to the above, it is also possible to use conventional thermal contact print heads, which achieve temperatures of about 350° C. to about 450° C. and resolutions of up to about 300 dots per inch (dpi), to drive recrystallization of the subject material and thereby effect material removal or etching.

The present inventive article 10 may include additional layers or coatings. Contemplated additional layers or coatings include plastic protective outer layers, that serve to render article 10 less susceptible to chemical attacks, and reflective metal layers and camouflage coatings, that serve to render article 10 less apparent under reflective illumination when article 10 is embedded in security papers, such as banknotes. Also included are adhesive layers that facilitate the incorporation of article 10 into or onto security documents.

Once a composite sheet, containing security features 14, 18, is prepared, as detailed above, the sheet can be slit into security threads using conventional techniques or divided into a large number of planchettes by a suitable die cutting operation.

Article 10 in the form of security threads and/or planchettes may be introduced into security papers, such as banknotes, during the manufacture of such security papers. For example, article 10, in the form of planchettes, may be pressed, optionally with the aid of an adhesive, onto the surface of a partially consolidated paper web, resulting in the surface mounting of such planchettes. Article 10, in the form of a security thread, may be incorporated within wet paper fibers while the fibers are unconsolidated and pliable, as taught by U.S. Pat. No. 4,534,398, resulting in the thread 10 being totally embedded in the resulting paper. Article 10, in the form of a thread, may also be fed into a cylinder mold papermaking machine, cylinder vat machine, or similar machine of known type, resulting in partial embeddment of thread 10 within the body of the finished paper (i.e., paper with a windowed thread). In addition, article 10, in the form of a thread, may be mounted on the surface of security papers either during or post manufacture.

Detection schemes contemplated for use with the present inventive article 10 include simple recognition/authentication schemes and data/identification/denomination detection schemes. Such dual machine-readable functionality is made possible by the combination of the soft magnetic material and the optionally repeating pattern 16. The use of the soft magnetic material enables simple recognition/authentication by mid-range (i.e., 1 to 2 mm between the detector head and the magnetic feature) examination of magnetic properties with an imposed magnetic field. Optionally repeating pattern 16 enables data/identification/denomination by near-contact magnetic reading of pattern 16 as it passes over a detection head.

Detectable magnetic characteristics of the soft magnetic materials of the present invention include permeability, coercivity, B-H (magnetization/demagnetization) loop, non-linearity and magnetization characteristics. One or more of these magnetic characteristics can be measured and compared against standard detection signatures for the purpose of authenticating and identifying or denominating the subject security document.

EXAMPLE

This Example describes a preferred method used to prepare a preferred embodiment of the present inventive article 10 and is not intended to limit the generally broad scope of the present invention.

In this Example, the following materials were used:

U.V. RESIST—a U.V. polymerized coating available from Sun Chemical Corp., 222-T Bridge Plaza South, P.O. Box 1302, Fort Lee, N.J. 07024, under the product designation RCA 01283R.

ETCH—an aqueous solution containing 40% by weight ferric chloride ($FeCl_3$).

METALLIZED FILM—a polyester film having a thickness of 0.023 cm and metallized with an alloy, similar to Vacuumschmelze 6025, to a thickness of 250 nm, obtained from Innovative Sputtering Technology, N.V., Karreweg 18, B-9870 Zulte, Belgium.

1. Resist and Etch Method—The prepared METALLIZED FILM or web was fed from a roll to a Mark Andes Flexographic multistation printing press (Model No. 4110). The web was then fed, at a web speed of 21.3 meters/minute, to a print station where it passed between a print roller and an impression roller. A quantity of U.V. RESIST, at ambient temperature, was delivered to the metallized surface of the web, through the print roller, in a pattern as set forth in FIG. 3 and at a rate sufficient to render a dry U.V. RESIST layer thickness of 1.5 microns. The U.V. RESIST layer was then cured under a focused 300 watt U.V. lamp for about 0.43 seconds. The web was then fed, at a web speed of 21.3 meters/minute, to an etching station where it passed through a dip tank (which accommodated 76 centimeters (cm) of web path, and which contained ETCH at a temperature of 74° C.) and picked up a layer of ETCH. Upon exiting the etching station excess ETCH was metered off the web with pinch rollers. The web was then fed through a neutralizing bath of sodium bicarbonate and then through a water bath and then dried with hot air dryers at 77° C.

2. Lamination and Coating—A quantity of a solvent-based adhesive was then applied to the patterned surface of the web at a rate sufficient to render a dry adhesive layer thickness of 4 microns and then the web was dried with hot air dryers at 77° C. A sheet of polyester film, having a thickness of 3.6 microns, was then fed from a roll onto the moving web and the web, with the polyester film overlayment, was passed under a hot nip, having a temperature of 71° C., to effect lamination of the film to the web. The laminated web was then passed through a pigment coating station where a quantity of a $TiO_2$-based coating was delivered to the surface of the laminated web at a rate sufficient to render a dry layer thickness of 2 microns. The pigment coated web was then dried with hot air dryers at 77° C. and a quantity of a water-based adhesive was then applied to the web at a rate sufficient to render a dry adhesive layer thickness of 2 microns. The web was then dried with hot air dryers at 77° C. and in a final step, the web was inverted and a layer of a $TiO_2$-based coating and a layer of a water-based adhesive were applied, as described hereinabove, to the other surface of the web.

It should be understood by those skilled in the art that obvious modifications can be made without departing from the spirit of the invention. Accordingly, reference should be made primarily to the accompanying claims, rather than the foregoing specification, to determine the scope of the invention.

Having thus described the invention, what is claimed is:

1. An article for use with security documents that comprises a plastic substrate having at least one security feature located thereon, wherein said security feature is a machine detectable security feature comprising a layer of a soft magnetic metal, wherein said soft magnetic metal is an amorphous metal glass having a low magnetic coercivity of from about 50 to about 5000 amperes per meter, and wherein said layer of said soft magnetic metal has a thickness ranging from about 0.10 to 0.50 microns.

2. An article for use with security documents that comprises a plastic substrate having at least one security feature located thereon, wherein said security feature is a machine detectable and optionally machine readable security feature comprising a layer of an optionally repeating pattern of soft magnetic metal, wherein said soft magnetic metal is an amorphous metal glass having a low magnetic coercivity of from about 50 to about 5000 amperes per meter, and wherein said layer of said soft magnetic metal has a thickness ranging from about 0.10 to 0.50 microns.

3. An article for use with security documents that comprises a plastic substrate having at least two security features located thereon, wherein a first security feature is a machine detectable and optionally machine readable security feature comprising an optionally repeating pattern of soft magnetic metal, and wherein a second security feature comprises: magnetic or non-magnetic metal formed indicia; or a combination of magnetic and non-magnetic metal formed indicia.

4. The article of claim 3, wherein said article is a planchette or platelet.

5. The article of claim 4, wherein said planchette or platelet is generally hexagonal in shape.

6. The article of claim 3, wherein said article is a security strip or thread.

7. A security thread for use with security documents that comprises a plastic substrate having at least two security features located thereon, wherein a first security feature is a machine detectable and optionally machine readable security feature comprising an optionally repeating pattern of soft magnetic metal, and wherein a second security feature comprises: magnetic or non-magnetic metal formed indicia; or a combination of magnetic and non-magnetic metal formed indicia.

8. The security thread of claim 7 wherein said thread comprises the following layers:
   a. a layer of said plastic substrate having a length; and
   b. a thin layer of said first and second security features, wherein said optionally repeating pattern of said first security feature comprises: at least one soft magnetic metal region and at least one partitioning region, optionally in alternating sequence across said length of said plastic substrate, and wherein said second security feature comprises: magnetic metal formed indicia and optionally non-magnetic metal formed indicia, wherein said indicia form at least a part of said soft magnetic metal region(s) and optionally form at least a part of said partitioning region(s).

9. The security thread of claim 8, wherein said thread further comprises a plastic protective layer.

10. The security thread of claim 8 wherein said first and second security features are coextensive security features in that said magnetic metal formed indicia of said second security feature are soft magnetic metal indicia that form said soft magnetic metal region(s) of said first security feature.

11. The security thread of claim 8 wherein said second security feature comprises soft magnetic metal formed indicia forming at least a part of said soft magnetic metal region(s) of said first security feature.

12. The security thread of claim 8 wherein said soft magnetic metal is an amorphous metal glass having a low magnetic coercivity of less than about 5000 amperes per meter.

13. The security thread of claim 12 wherein said amorphous metal glass is a cobalt/iron based alloy.

14. The security thread of claim 12 wherein said amorphous metal glass is an iron/nickel based alloy.

15. The security thread of claim 12 wherein said amorphous metal glass is an cobalt/nickel based alloy.

16. The security thread of claim 8 wherein said thin layer of said first and second security features is deposited onto said substrate layer by a physical vapor deposition process.

17. The security thread of claim 8 wherein said thin layer of said first and second security features is deposited onto said substrate layer by a chemical vapor deposition process.

18. The security thread of claim 16 wherein said thin layer of said first and second security features is deposited onto said substrate layer by sputtering.

19. The security thread of claim 18 wherein after deposition of said thin layer of said first and second security features by sputtering, said deposited layer is subjected to a selective demetallization process.

20. The security thread of claim 19 wherein said selective demetallization process is a chemical etching demetallization process.

21. The security thread of claim 19 wherein said selective demetallization process is a laser ablation demetallization process.

22. The security thread of claim 19 wherein said selective demetallization process is an abrasion demetallization process.

23. The security thread of claim 19 wherein said selective demetallization process is a lift-off demetallization process.

24. The security thread of claim 8 wherein said soft magnetic metal region(s) and said metal formed indicia have thicknesses ranging from about 0.01 to about 10 microns and lengths ranging from about 0.1 to about 5.0 millimeters.

25. The security thread of claim 8 wherein said thin layer of said first and second security features has a first side and a second side, wherein said thread further comprises at least one layer comprising a reflective metal material selected from the group consisting of aluminum, nickel and silver, and wherein said reflective metal layer(s) is located on at least said first side of said thin layer of said first and second security features.

26. A security paper having an article at least partially embedded therein or mounted thereon, wherein said article comprises a plastic substrate having at least one security feature located thereon, wherein said security feature is a machine detectable and optionally machine readable security feature comprising a layer of an optionally repeating pattern of soft magnetic metal, wherein said soft magnetic metal is an amorphous metal glass having a low magnetic coercivity of from about 50 to about 5000 amperes per meter, and wherein said layer of said soft magnetic metal has a thickness ranging from about 0.10 to 0.50 microns.

27. A security paper having an article at least partially embedded therein or mounted thereon, wherein said article comprises a plastic substrate having at least two security features located thereon, wherein a first security feature is a machine detectable and optionally machine readable security feature comprising an optionally repeating pattern of soft magnetic metal, and wherein a second security feature comprises magnetic and/or non-magnetic metal formed indicia.

28. The security paper of claim 27 wherein said article is a planchette or platelet.

29. The security paper of claim 28 wherein said planchette or platelet is generally hexagonal in shape.

30. The security paper of claim 27 wherein said article is a security strip or thread.

31. A security thread for use with security documents that comprises the following layers:

a. a layer of a plastic substrate having a length; and b. a thin layer of a first and a second security feature located on said plastic substrate, wherein said first security feature is a machine detectable and optionally machine readable security feature that comprises an optionally repeating pattern of soft magnetic metal, wherein said second security feature comprises: magnetic metal formed indicia and optionally non-magnetic metal formed indicia, wherein said optionally repeating pattern of said first security feature comprises: at least one soft magnetic metal region and at least one partitioning region, optionally in alternating sequence across said length of said plastic substrate, and wherein said indicia of said second security feature form at least a part of said soft magnetic metal region(s) and optionally form at least a part of said partitioning region(s).

* * * * *